United States Patent
Yang et al.

(10) Patent No.: US 9,071,056 B2
(45) Date of Patent: Jun. 30, 2015

(54) APPARATUS AND METHOD FOR MANAGING BATTERY CELL, AND ENERGY STORAGE SYSTEM

(75) Inventors: Jong-Woon Yang, Yongin-si (KR); Eui-Jeong Hwang, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 409 days.

(21) Appl. No.: 13/591,043

(22) Filed: Aug. 21, 2012

(65) Prior Publication Data

US 2013/0113280 A1    May 9, 2013

Related U.S. Application Data

(60) Provisional application No. 61/555,919, filed on Nov. 4, 2011.

(51) Int. Cl.
*H02J 7/00* (2006.01)

(52) U.S. Cl.
CPC ............ *H02J 7/0016* (2013.01); *Y02T 10/7055* (2013.01)

(58) Field of Classification Search
CPC ....... H02J 7/0016; H02J 7/0068; Y02E 60/12
USPC .................................... 307/19; 320/119, 134
See application file for complete search history.

(56) References Cited

U.S. PATENT DOCUMENTS

| | | |
|---|---|---|
| 2003/0210017 A1 | 11/2003 | Tsujii et al. |
| 2006/0022646 A1 | 2/2006 | Moore et al. |
| 2006/0043934 A1 | 3/2006 | Sugimoto |
| 2010/0085009 A1 | 4/2010 | Kang et al. |
| 2010/0253287 A1 | 10/2010 | Kim et al. |
| 2012/0094151 A1 | 4/2012 | Kim |
| 2012/0133330 A1 | 5/2012 | Kamata et al. |
| 2013/0175867 A1 | 7/2013 | Park |

FOREIGN PATENT DOCUMENTS

| | | |
|---|---|---|
| JP | 2006-73364 A | 3/2006 |
| JP | 2008-236991 A | 10/2008 |
| JP | 2011-120456 A | 6/2011 |
| KR | 10-2007-0095023 A | 9/2007 |
| KR | 10-2008-0013136 A | 2/2008 |
| KR | 10-2009-0123821 A | 12/2009 |

OTHER PUBLICATIONS

Korean Office Action dated Oct. 1, 2013 for Korean Patent Application No. KR 10-2012-0088954, which shares priority of U.S. Appl. No. 61/555,919, filed Apr. 11, 2011, with captioned U.S. Appl. No. 13/591,043.

(Continued)

*Primary Examiner* — Sun Lin
(74) *Attorney, Agent, or Firm* — Knobbe, Martens, Olson & Bear, LLP

(57) ABSTRACT

An energy storage system which balances cell voltages and a method of balancing cell voltages are disclosed. The system and method use a temperature of balancing resistors to determine a time for the balancing resistors to be selectively connected across battery cells so as to balance the battery cells.

20 Claims, 7 Drawing Sheets

(56) References Cited

OTHER PUBLICATIONS

European Examination Report dated Mar. 4, 2014 for European Patent Application No. EP 12 182 892.5 which claims priority from U.S. Appl. No. 61/555,919, filed Apr. 11, 2011, and captioned U.S. Appl. No. 13/591,043.

Extended European Search Report dated Feb. 14, 2013 for European Patent Application No. EP 12 182 892.5 which claims priority from U.S. Appl. No. 61/555,919, filed Nov. 4, 2011; and captioned U.S. Appl. No. 13/591,043.

APPARATUS AND METHOD FOR MANAGING BATTERY CELL, AND ENERGY STORAGE SYSTEM

CROSS-REFERENCE TO RELATED APPLICATIONS

This application claims priority to U.S. Provisional No. 61/555,919, titled "APPARATUS FOR MANAGING BATTERY, METHOD FOR BALANCING BATTERY CELLS, AND ENERGY STORAGE SYSTEM" filed Nov. 4, 2011, which is hereby incorporated by reference in its entirety.

BACKGROUND

1. Field

The disclosed technology relates to a method and apparatus for managing a battery system and an energy storage system.

2. Description of the Related Technology

As battery systems are being widely used, high-capacity batteries are in great demand. In high-capacity batteries, as the magnitude of current and voltage output are increased, high device reliability is required, and also the high-capacity batteries are required not to generate excessive heat while outputting high current. In addition, frequently many battery cells are used to provide a large power storage battery, and thus highly efficient cell balancing is required.

In addition, due to problems of environmental destruction, resource exhaustion, and the like, there is increasing demand for systems capable of efficiently using stored power. Also, there is increasing demand for renewable energy that does not cause pollution during power generation. In an energy storage system a renewable energy source, a power storing battery, and existing power from a grid are connected and coordinated.

SUMMARY

One inventive aspect is an energy storage system, configured to be connected to at least one of a power generating system, a grid, and a load. The energy storage system includes a battery system configured to store power received from at least one of the grid and the power generating system and/or to provide power to at least one of the grid and the load. The battery system includes a plurality of cell balancing resistors, each configured to be selectively connected across one of a plurality of battery cells. The energy storage system also includes a cell balancing controller configured to determine a time for the resistors to be connected across the battery cells according to the temperature of at least one of resistors.

Another inventive aspect is a method of balancing battery cell voltages. The method includes selectively connecting a plurality of balancing resistors to a plurality of battery cells. The method also includes varying a time for the resistors to be connected across the battery cells according to the temperature of at least one of the resistors.

DETAILED DESCRIPTION OF CERTAIN INVENTIVE EMBODIMENTS

Certain features and aspects are described more fully below with reference to the accompanying drawings, in which exemplary embodiments are shown. The invention may, however, be embodied in many different forms and should not be construed as being limited to the embodiments set forth herein. \The examples and conditional language recited herein are to be construed as being without limitation to such specifically recited examples and conditions. Throughout the specification, a singular form may include plural forms, unless there is a particular description contrary thereto. Also, terms such as "comprise" or "comprising" are used to specify existence of a recited form, a number, a process, an operation, a component, and/or groups thereof, not excluding the existence of one or more other recited forms, one or more other numbers, one or more other processes, one or more other operations, one or more other components and/or groups thereof. While terms "first" and "second" are used to describe various components, the components are not limited to the terms "first" and "second". The terms "first" and "second" are used only to distinguish between each component.

According to certain embodiments, a cell balancing resistor is prevented from being destroyed by a cell balancing current. Also, a battery system may stably perform cell balancing during high charging current and high voltage.

A battery managing apparatus and a battery managing method according to embodiments may be used in various battery systems. For example, a battery managing apparatus and a battery managing method according to an embodiment may be used in systems providing a high voltage and a high power such as an energy storage system, an electric car, or the like. Hereinafter, embodiments of the battery managing apparatus and the battery managing method used in an energy storage system 1 are described.

Figure 1:
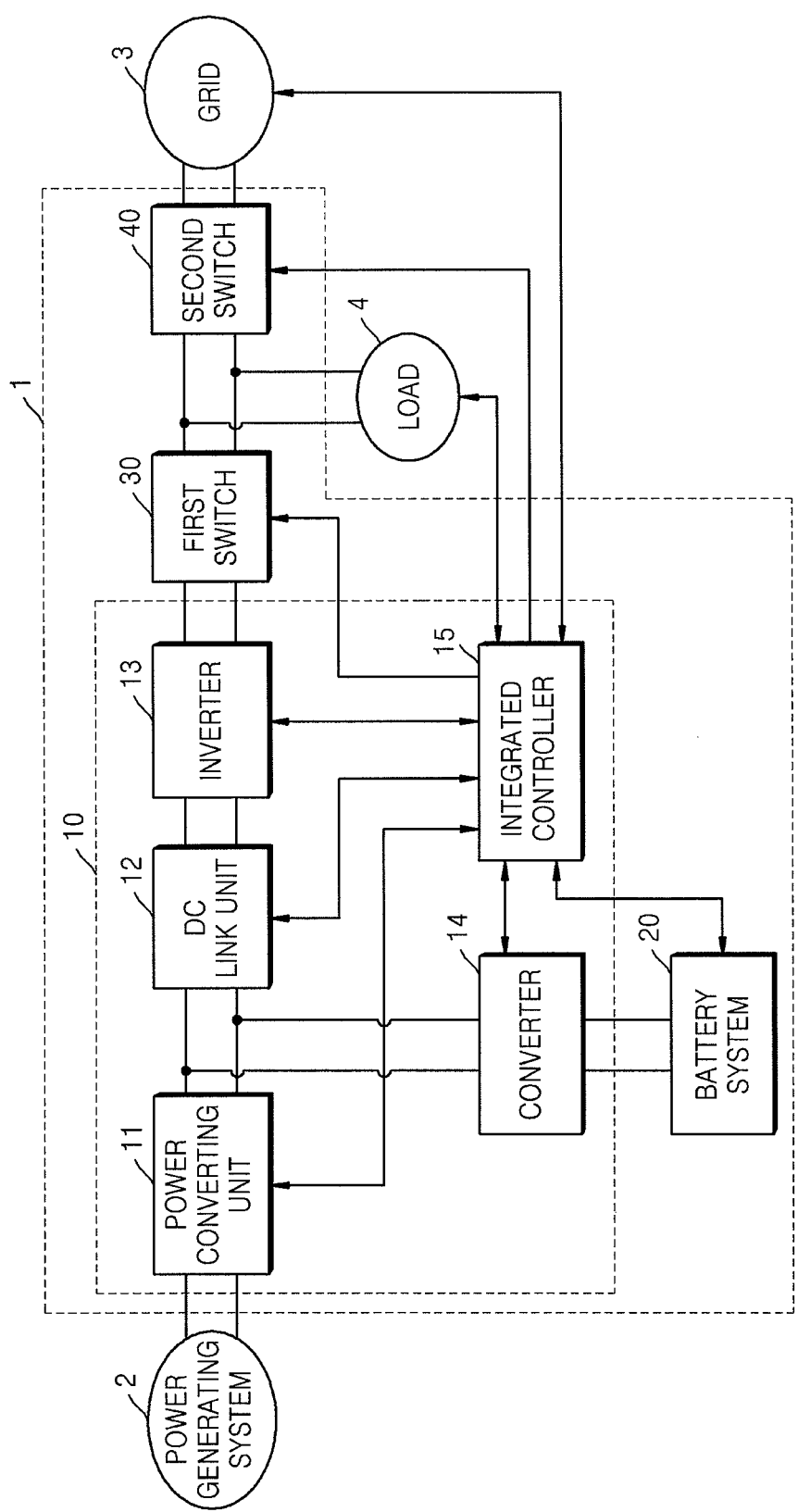
FIG. 1 is a diagram illustrating a configuration of an energy storage system according to an embodiment.

FIG. 1 is a diagram illustrating a configuration of an energy storage system 1 according to an embodiment. Referring to FIG. 1, the energy storage system 1 supplies power to a load 4 from a power generating system 2 and a grid 3.

The power generating system 2 is a system for generating power by using an energy source, and supplies the generated power to the energy storage system 1. The power generating system 2 may be, for example, a solar power generating system, a wind power generating system, a tidal power generating system, or the like. However, examples of the power generating system 2 are not limited thereto and thus, the power generating system 2 may include power generating systems for generating power by using a renewable energy including solar heat, terrestrial heat, or the like. For example, a solar cell that generates electric energy from sunlight may be installed at a house or a factory and thus the solar cell may be applied to the energy storage system 1, which may be used to distribute power to each of a plurality of houses or factory loads. The power generating system 2 may include a plurality of power generating modules arranged in parallel with each other, and generate power via each of the power generating modules, so that the power generating system 2 may be a large capacity energy system.

The grid 3 includes a power generating station, a substation, a power transmission line, and the like. When the grid 3 is in a normal status, the grid 3 supplies power to the energy storage system 1 so as to allow the power to be supplied to the load 4 and/or a battery system 20, and receives power from the energy storage system 1. When the grid is in an abnormal status, power from the grid 3 to the energy storage system 1 is stopped, and power from the energy storage system 1 to the grid 3 is also stopped.

The load 4 consumes power generated by the power generating system 2, power stored in the battery system 20, and power supplied from the grid 3. Examples of the load 4 include a house, a factory, or the like.

The energy storage system 1 may store power generated by the power generating system 2 in the battery system 20, or may supply the power to the grid 3. Also, the energy storage system 1 may supply power stored in the battery system 20 to the grid 3, or may store power supplied from the grid 3 in the battery system 20. In addition, when the grid 3 is in an abnormal status, e.g., when a power failure occurs in the grid 3, the energy storage system 1 may perform an Uninterruptible Power Supply (UPS) operation and supply power to the load 4. When the grid 3 is in the normal status, the energy storage system 1 may supply power generated by the power generating system 2 or the power stored in the battery system 20 to the load 4.

The energy storage system 1 includes a power conversion system 10 for controlling power conversion, the battery system 20, a first switch 30, and a second switch 40.

The power conversion system 10 converts power from the power generating system 2, the grid 3, and the battery system 20 according to a required specification, and supplies the power to a desired component. The power conversion system 10 includes a power converting unit 11, a direct current (DC) link unit 12, an inverter 13, a converter 14, and an integrated controller 15.

The power converting unit 11 is a power converting device that is connected between the power generating system 2 and the DC link unit 12. The power converting unit 11 converts a voltage output from the power generating system 2 into a DC link voltage, and delivers power generated by the power generating system 2 to the DC link unit 12.

According to the power generating system 2, the power converting unit 11 may be formed as a power converting circuit including a converter, a rectifier circuit, or the like. In a case where the power generating system 2 generates DC power, the power converting unit 11 may function as a DC/DC converter. In a case where the power generating system 2 generates alternating current (AC) power, the power converting unit 11 may function as a rectifier circuit for converting AC power into DC power. In particular, when the power generating system 2 is a solar power generating system, the power converting unit 11 may include a maximum power point tracking (MPPT) converter for performing MPPT control so as to maximally obtain power generated by the power generating system 2 according to changes in solar radiation intensity, temperature, and the like. When the power generating system 2 does not generate power, the power converting unit 11 may stop its operation so as to reduce power consumed by a converter, or the like.

A level of the DC link voltage may be unstable due to a sudden voltage drop in the power generating system 2 or the grid 3 or a sudden change in the load 4. However, it is beneficial to stabilize the level of the DC link voltage for normal operation of the converter 14 and the inverter 13. The DC link unit 12 is connected between the power converting unit 11 and the inverter 13, to maintain the level of the DC link voltage. For example, a large-capacitance capacitor may be used as the DC link unit 12.

The inverter 13 is a power converting device connected between the DC link unit 12 and the first switch 30. The inverter 13 includes an inverter that converts the DC link voltage into an AC voltage appropriate for the grid 3, and then outputs the AC voltage. Also, in order to store power from the grid 3 in the battery system 20, the inverter 13 may include a rectifier circuit that rectifies an AC voltage of the grid 3, converts the AC voltage into the DC link voltage, and then outputs the DC link voltage. That is, the inverter 13 may be a bidirectional inverter whose input and output directions may be changed.

The inverter 13 may include a filter for removing a harmonic power from the AC voltage output from the grid 3. Also, the inverter 13 may include a phase locked loop (PLL) circuit for synchronizing a phase of an AC voltage output from the inverter 13 with a phase of the AC voltage output from the grid 3 so as to reduce reactive power loss. In addition, the inverter 13 may perform functions including restriction of a voltage variation range, improvement of a power factor, removal of a DC component, transient phenomenon protection, and the like. When the inverter 13 is not used, an operation of the inverter 13 may be stopped to reduce power consumption.

The converter 14 is a power converting device connected between the DC link unit 12 and the battery system 20. In a discharge mode, the converter 14 includes a converter that DC-DC converts a voltage of power stored in the battery system 20 into the DC link voltage, i.e., a voltage level required by the inverter 13. Also, in a charge mode, the converter 14 includes a converter that DC-DC converts the DC link voltage into a charge voltage, i.e., a voltage level required by the battery system 20. That is, the converter 14 may be a bidirectional converter whose input and output directions may be changed. When it is not necessary to charge or discharge the battery system 20, an operation of the converter 14 may be stopped to reduce power consumption.

The integrated controller 15 monitors the statuses of the power generating system 2, the grid 3, the battery system 20, and the load 4, and controls operations of the power converting unit 11, the inverter 13, the converter 14, the battery system 20, the first switch 30, and the second switch 40 according to a result of the monitoring. The integrated controller 15 may monitor whether a power failure occurs in the grid 3, whether power is generated by the power generating system 2, the amount of power generated if the power generating system 2 generates power, a charge status of the battery system 20, power consumption of the load 4, a time, or the like. Also, in a case where power to be supplied to the load 4 is not sufficient due to the power failure in the grid 3 or the like, the integrated controller 15 may decide a priority order with respect to power consuming devices included in the load 4 and then may control the load 4 to supply power to a power consuming device having higher priority.

The first switch 30 and the second switch 40 are serially connected between the inverter 13 and the grid 3, and perform on/off operations according to control by the integrated controller 15, so that the first switch 30 and the second switch 40 control current between the power generating system 2 and the grid 3. The first switch 30 and the second switch 40 may be turned on or off according to statuses of the power generating system 2, the grid 3, and the battery system 20.

In more detail, when power from the power generating system 2 and/or the battery system 20 is supplied to the load 4, or when power from the grid 3 is supplied to the battery system 20, the first switch 30 is turned on. When power from the power generating system 2 and/or the battery system 20 is supplied to the grid 3, or when power from the grid 3 is supplied to the load 4 and/or the battery system 20, the second switch 40 is turned on.

When a power failure occurs in the grid 3, the second switch 40 is turned off and the first switch 30 is turned on. That is, the power from the power generating system 2 and/or the battery system 20 supplied to the load 4, and is prevented from flowing to the grid 3. Also, by isolating the energy storage system 1 from the grid 3, it is possible to prevent a worker who works with a power line of the grid 3 from receiving power from the energy storage system 1.

A switching device including a relay or the like capable of enduring a large current may be used as the first switch 30 and the second switch 40.

The battery system 20 receives and stores power from the power generating system 2 and/or the grid 3, and supplies stored power to the load 4 or the grid 3. The battery system 20 may include a part for storing power, and a controlling unit. Hereinafter, the battery system 20 will now be described in detail with reference to FIG. 2.

Figure 2:
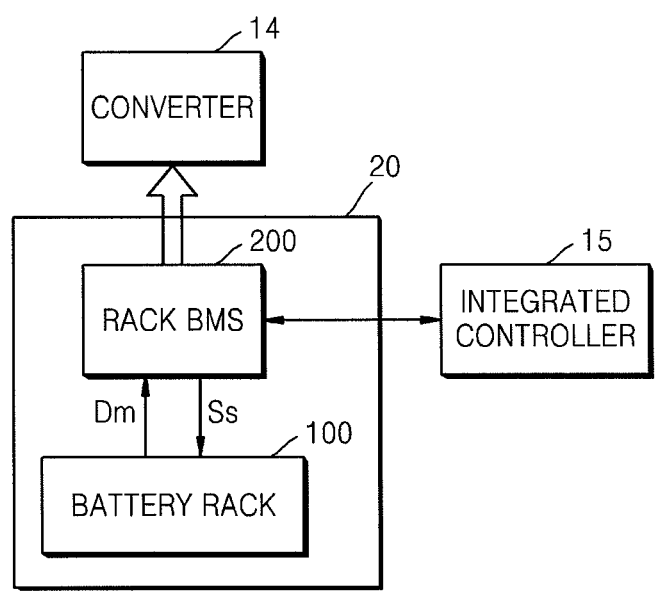
FIG. 2 is a diagram illustrating a configuration of a battery system, according to an embodiment.

FIG. 2 is a diagram illustrating a configuration of the battery system 20, according to an embodiment. Referring to FIG. 2, the battery system 20 includes a battery rack 100 and a rack battery management system (BMS) 200.

The battery rack 100 stores power supplied from an external source, that is, the power generating system 2 and/or the grid 3, and supplies stored power to the load 4 and/or the grid 3. The battery rack 100 may include a plurality of battery trays which will be described in detail with reference to FIG. 3.

The rack BMS 200 is connected to the battery rack 100 and may control charging and discharging operations of the battery rack 100. The rack BMS 200 may also perform various functions including overcharging protection, overdischarging protection, overcurrent protection, overvoltage protection, overheating protection, cell balancing control, and the like. For this, the rack BMS 200 transmits a synchronizing signal Ss to the battery rack 100 and receives monitoring data Dm regarding a voltage, a current, a temperature, an amount of power remaining, lifespan, a charging state, etc. of battery cells from tray BMSs 120-1 to 120-n included in the battery rack 100. In addition, the rack BMS 200 may apply the received monitoring data Dm to the integrated controller 15 and receive commands related to control of the battery rack 110 from the integrated controller 15.

The rack BMS 200 may also charge power in the rack BMS 200 or discharge power stored in the rack BMS 200 under the control of the integrated controller 15. Furthermore, the rack BMS 200 may control charging/discharging current of the battery rack 100 under the control of the integrated controller 15. The charging/discharging current may be input/output to/from the battery system 20 via the converter 14.

Figure 3:
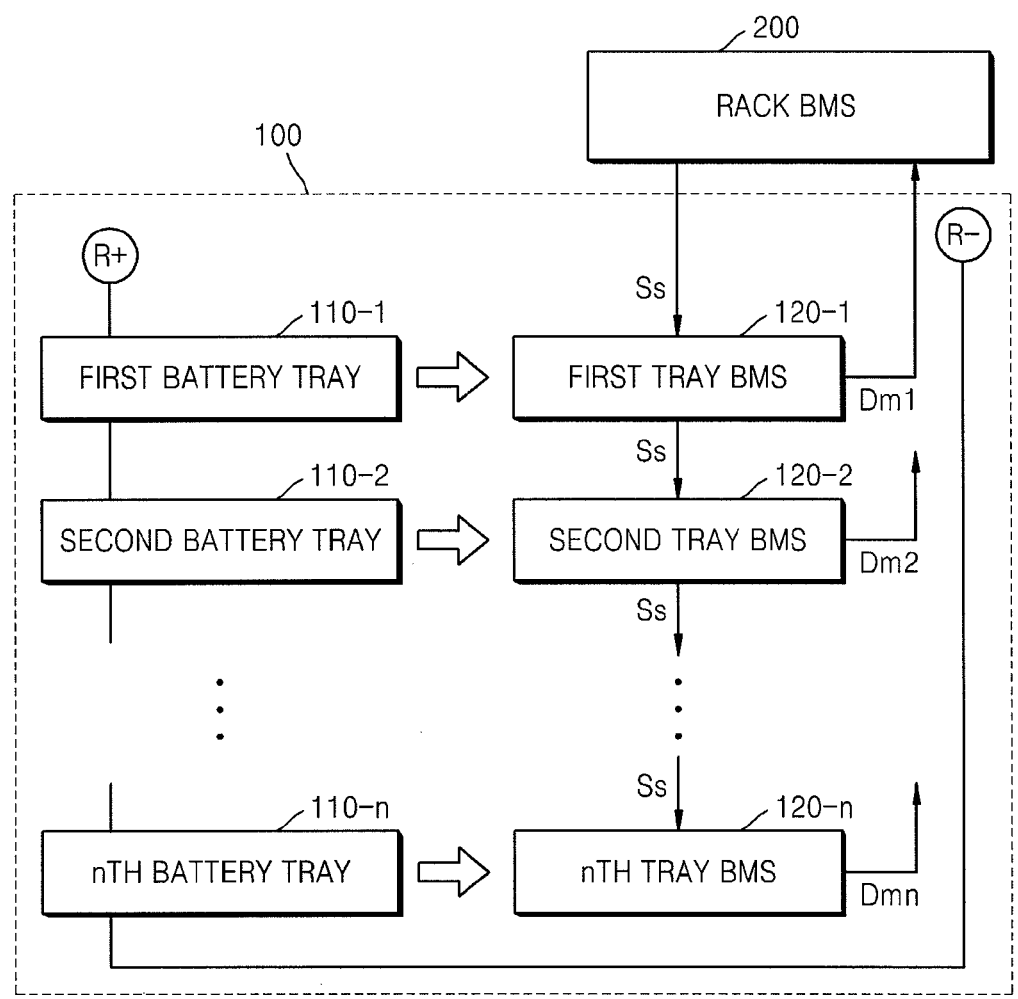
FIG. 3 is a diagram illustrating a configuration of a battery rack, according to an embodiment.

FIG. 3 is a diagram illustrating a configuration of the battery rack 100, according to an embodiment. Referring to FIG. 3, the battery rack 100 may include a first battery tray 110-1 through an nth battery tray 110-n that are sub-units connected in series and/or in parallel. Each of the first battery tray 110-1 through the nth battery tray 110-n may include a plurality of battery cells as sub-units. One of various chargeable secondary batteries may be used as the battery cell. For example, the various secondary batteries that may be used as the battery cell include a nickel-cadmium battery, a lead battery, a nickel metal hydrate (NiMH) battery, a lithium ion battery, a lithium polymer battery, or the like.

The battery rack 100 may adjust output of the first battery tray 110-1 through the nth battery tray 110-n under the control of the rack BMS 200, and may output power by using a positive output terminal R+ and a negative output terminal R−.

Also, the battery rack 100 may include a first tray BMS 120-1 through an nth tray BMS 120-n that correspond to the first battery tray 110-1 through the nth battery tray 110-n, respectively. The first tray BMS 120-1 through the nth tray BMS 120-n receive synchronizing signals Ss from the rack BMS 200 and monitor voltages, currents, temperatures, and the like of the corresponding first battery tray 110-1 through nth battery tray 110-n. Results of the monitoring of the first tray BMS 120-1 through the nth tray BMS 120-n may be transmitted to the rack BMS 200.

Figure 4:
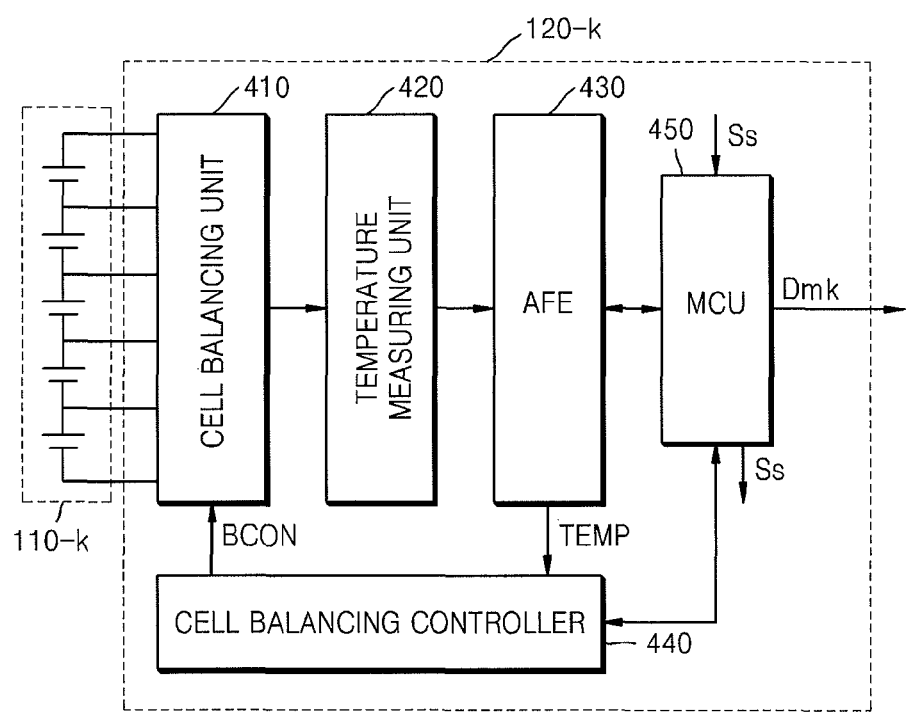
FIG. 4 is a diagram illustrating structures of a kth battery tray and a kth tray battery management system (BMS), according to an embodiment

FIG. 4 is a diagram illustrating a structure of a kth battery tray 110-k and a kth tray BMS 120-k, according to an embodiment. Here, k is an integer that is greater than 0 and equal to or less than n. The kth battery tray 110-k indicates a structure of each of the first battery tray 110-1 through the nth battery tray 110-n, and the kth tray BMS 120-k indicates a structure of each of the first tray BMS 120-1 through the nth tray BMS 120-n.

The kth battery tray 110-k includes one or more battery cells that are connected to each other in series or in parallel. As described above, the one or more battery cells may be embodied by using one of various chargeable secondary batteries.

The kth tray BMS 120-k includes a cell balancing unit 410, a temperature measuring unit 420, an analog front end (AFE) 430, a cell balancing controller 440, and a micro controller unit (MCU) 450.

The cell balancing unit 410 performs a cell balancing operation for removing a difference in voltage between the battery cells included in the kth battery tray 110-k. For this, the cell balancing unit 410 may include a plurality of cell balancing resistors to adjust voltages of each terminal of each battery cell.

The temperature measuring unit 420 measures temperatures of the cell balancing resistors included in the cell balancing unit 410. According to the current embodiment, the temperature measuring unit 420 may measure only temperatures of some of the cell balancing resistors. Alternatively, the temperature measuring unit 420 may measure temperatures of all the cell balancing resistors.

The temperature measuring unit 420 may be configured using, for example, a thermistor capable of measuring a temperature of a cell balancing resistor.

The AFE 430 monitors a voltage, a current, a temperature, an amount of power remaining, lifespan, a charging state, or the like of the kth battery tray 110-k. Also, the AFE 430 analog-digital converts measured data and transmits the converted data to the MCU 450. According to the current embodiment, the AFE 430 may monitor the temperature of the cell balancing resistor that is measured by the temperature measuring unit 420, analog-digital convert the measured temperature, and transmit a temperature data TEMP to the MCU 450 and the cell balancing controller 440.

The cell balancing controller 440 controls a cell balancing operation according to a difference in voltage between the battery cells included in the kth battery tray 110-k and a temperature of the cell balancing resistor of the cell balancing unit 410. For example, the cell balancing controller 440 determines a time for the cell balancing resistors to be connected across the battery cells according to the temperature data TEMP.

According to an embodiment, the cell balancing controller 440 controls whether to perform cell balancing and a duty ratio of the cell balancing. For example, when a temperature of the cell balancing resistor is greater than a first reference temperature T1, the cell balancing controller 440 may reduce balancing current by adjusting a duty ratio of a cell balancing cycle. For example, when a temperature of the cell balancing resistor is equal to or greater than 60° C., the cell balancing controller 440 starts adjusting a duty ratio of a cell balancing cycle. At this time, the cell balancing controller 440 may reduce the duty ratio by about 5% whenever the temperature of the cell balancing resistor is increased by 1° C.

As a magnitude of cell balancing current is increased, an amount of heat generated in the cell balancing resistor is increased, thereby increasing a temperature of the cell balancing resistor. However, if a temperature of the cell balancing resistor is increased, a resistance characteristic of the cell balancing resistor is changed, and thus accuracy of cell balancing control is decreased, thereby resulting in a much higher risk of destruction of the cell balancing resistor. In the current embodiment, as a temperature of the cell balancing resistor is increased, a duty ratio of cell balancing is decreased, and thus a resistance characteristic of the cell balancing resistor is prevented from being changed and the cell balancing resistor is prevented from being destroyed, thereby increasing reliability of the battery system 20.

According to another embodiment, when a temperature of the cell balancing resistor is equal to or greater than a second reference temperature T2, the cell balancing controller 440 may stop cell balancing. The second reference temperature T2 is greater than the first reference temperature T1. According to another embodiment, when a temperature of the cell balancing resistor is greater than the second reference temperature T2, the cell balancing controller 440 may stop cell balancing to prevent the cell balancing resistor from being destroyed. For example, when a temperature of the cell balancing resistor is equal to or greater than 70° C., a duty ratio of cell balancing may be set to 0% to stop the cell balancing.

Also, the cell balancing controller 440 according to the current embodiment may perform cell balancing only in a case where a difference in voltage between battery cells of the kth battery tray 110-$k$ is equal to or greater than a reference voltage, and may not perform cell balancing in a case where a difference in voltage between battery cells of the kth battery tray 110-$k$ is less than the reference voltage. Thus, unnecessary cell balancing may be prevented, thereby preventing heat from being generated due to the cell balancing and preventing the cell balancing resistor from being degraded. In this regard, it may be determined whether the difference in voltage between the battery cells is equal to, greater than, or less than the reference voltage only in a case where the cell balancing resistor is fully charged.

When charging/discharging current is equal to or greater than a reference current, the cell balancing controller 440 may finish cell balancing. Also, when charging/discharging current is less than the reference current, the cell balancing controller 440 may finish cell balancing.

Also, the cell balancing controller 440 may operate according to a control signal applied from the MCU 450.

The MCU 450 controls operations of the kth battery tray 110-$k$ and the kth tray BMS 120-$k$. The MCU 450 controls an operation of the AFE 430 and collects monitoring data from the AFE 430. Also, the MCU 450 operates in synchronization with other battery trays and the rack BMS 200 according to a synchronizing signal Ss, provides monitoring data Dmk to the rack BMS 200, and receives a control signal from the rack BMS 200.

Although the cell balancing controller 440 is illustrated as a separate block in FIG. 4, the cell balancing controller 440 may be integrally formed with the MCU 450 or the AFE 430 as a part of the MCU 450 or the AFE 430.

Also, in FIG. 4, the MCU 450 is embedded in the tray BMS 120-$k$. However, the MCU 450 may not be embedded in the tray BMS 120-$k$, and thus the tray BMS 120-$k$ may be directly controlled by the rack BMS 200 or the integrated controller 15. When the tray BMS 120-$k$ is directly controlled by the rack BMS 200 to perform cell balancing, the cell balancing may be controlled in units of a plurality of the battery trays 110-$k$. When the tray BMS 120-$k$ is directly controlled by the integrated controller 15, the cell balancing may be controlled in units of a plurality of the battery racks 100.

Figure 5:
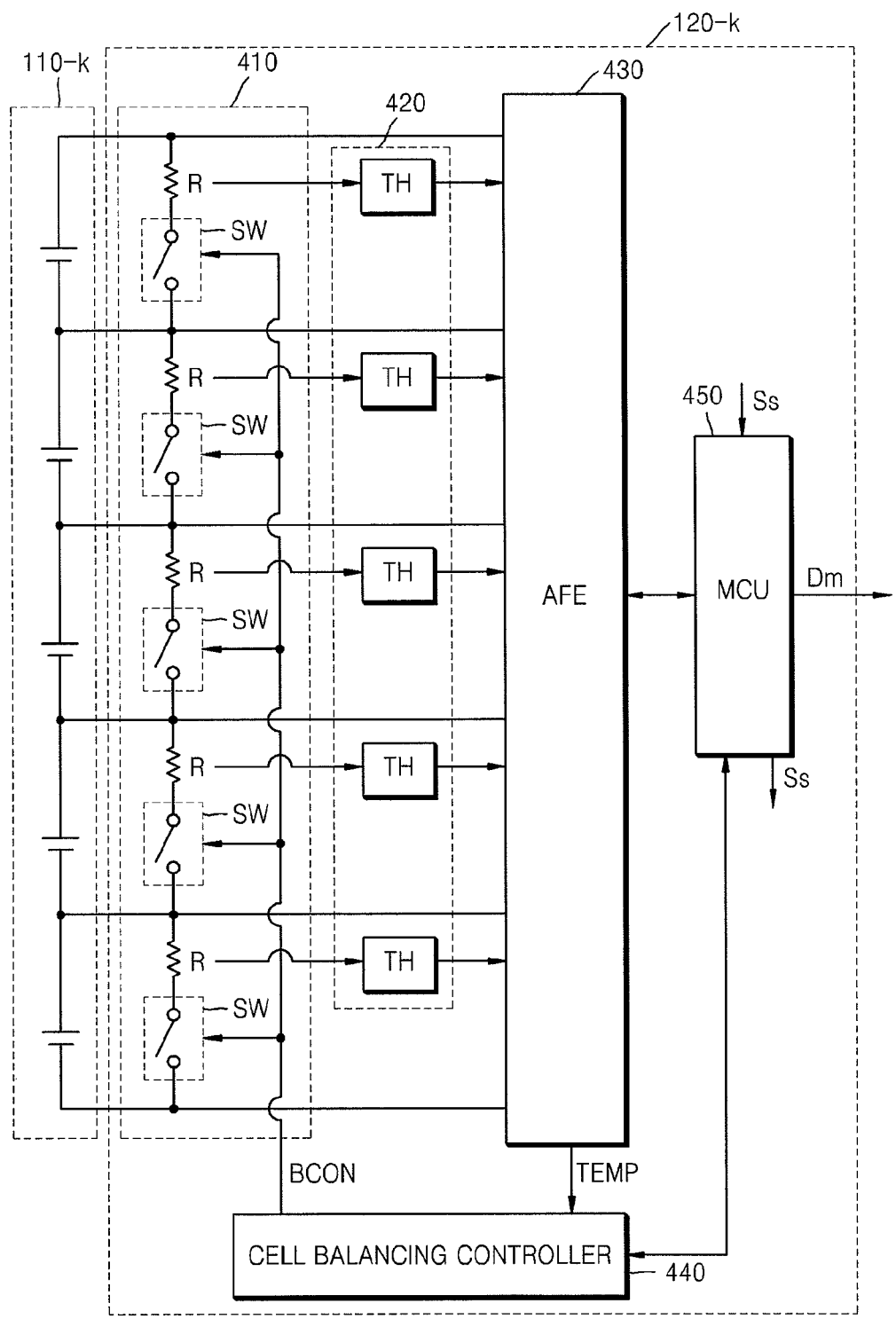
FIG. 5 is a diagram illustrating structures of kth battery tray and a kth tray BMS, according to an embodiment.

FIG. 5 is a diagram illustrating structures of the kth battery tray 110-$k$ and the kth tray BMS 120-$k$, according to an embodiment. According to the current embodiment, the cell balancing unit 410 may have a structure in which a plurality of cell balancing resistors R and a plurality of switching devices SW are connected to each other in series and one cell balancing resistor R and switching device SW pair is connected to each battery cell in parallel. When each of the switching devices SW is switched on, balancing current flows via the cell balancing resistor R, and thus a cell balancing operation for decreasing a difference in voltage between the battery cells is performed.

Each of the switching devices SW may be switched on or off according to a balancing control signal BCON applied from the cell balancing controller 440. The balancing control signal BCON may have a cell balancing pulse for switching on the switching device SW, and the cell balancing pulse may be applied to a cell balancing period during an operation cycle of the kth tray BMS 120-$k$.

Figure 6:
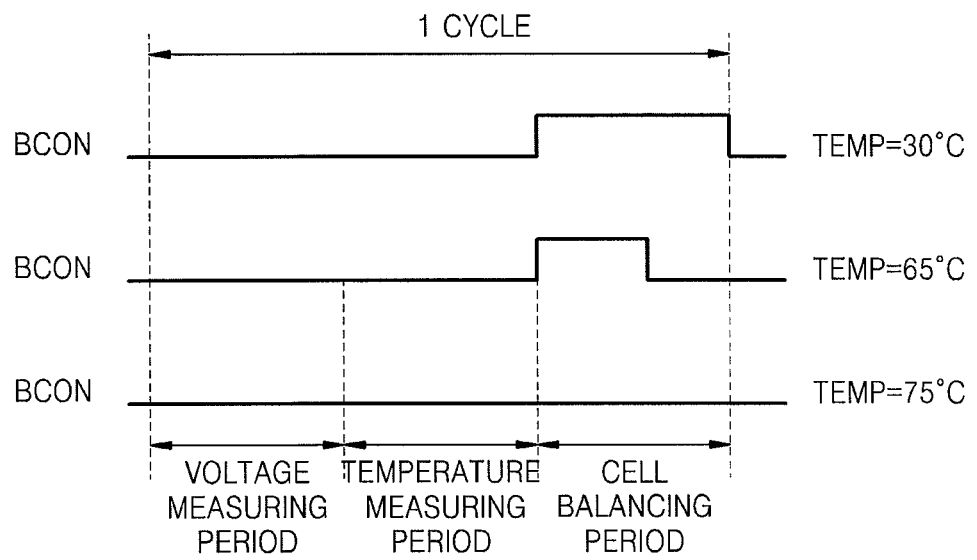
FIG. 6 is a diagram illustrating waveforms of a balancing control signal (BCON), according to an embodiment.

FIG. 6 is a diagram illustrating waveforms of the balancing control signal BCON, according to an embodiment. FIG. 6 illustrates waveforms of the balancing control signal BCON in cases where a temperature TEMP of the cell balancing resistors is 30° C., 65° C., and 75° C. In FIG. 6, the first reference temperature T1 is 60° C., and the second reference temperature T2 is 70° C.

According to the current embodiment, one operation cycle 1 CYCLE of the kth tray BMS 120-$k$ may include a voltage measuring period, a temperature measuring period, and a cell balancing period.

As illustrated in FIG. 6, the temperature TEMP of the cell balancing resistor R is less than the first reference temperature T1, that is, when the temperature TEMP of the cell balancing resistor R is 30° C., the balancing control signal BCON has a cell balancing pulse having a maximum duty ratio. For example, the maximum duty ratio may be 100% during the cell balancing period.

If the temperature TEMP of the cell balancing resistor R is greater than the first reference temperature T1 and is less than the second reference temperature T2, a duty ratio of the cell balancing pulse during the cell balancing period is adjusted according to a temperature. For example, when a temperature of the cell balancing period is 65° C., the cell balancing pulse during the cell balancing period has a duty ratio of 50%.

When the temperature TEMP of the cell balancing resistor R is greater than the second reference temperature T2, the cell balancing pulse has a duty ratio of 0%, and cell balancing is not performed during the corresponding cycle.

Figure 7:
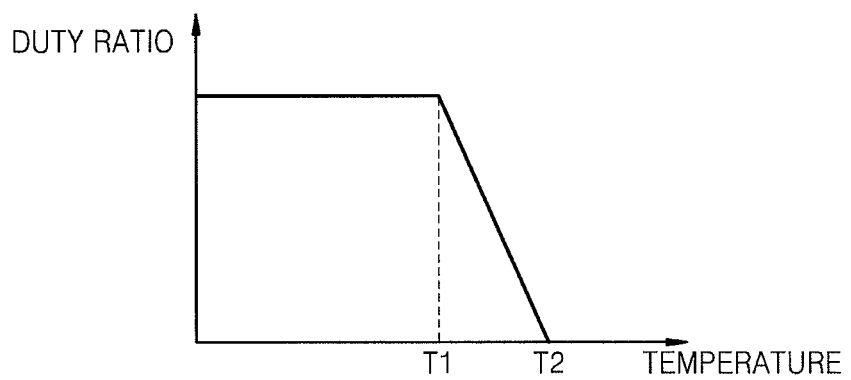
FIG. 7 is a graph illustrating a duty ratio of a cell balancing pulse according to a temperature, according to an embodiment.

FIG. 7 is a graph illustrating the duty ratio of the cell balancing pulse as a function of the temperature TEMP, according to an embodiment. According to the current embodiment, as illustrated in FIG. 7, the cell balancing pulse has a constant duty ratio during a cell balancing period when the temperature TEMP of the cell balancing resistor R is equal to or less than the first reference temperature T1. As the temperature TEMP of the cell balancing resistor R is increased, the duty ratio of the cell balancing pulse between the first reference temperature T1 and the second reference temperature T2 is decreased. In this embodiment the duty ratio is a linear function of the temperature TEMP when the temperature TEMP is between the first and second reference temperatures T1 and T2. Also, when the temperature TEMP of the cell balancing resistor R is equal to or greater than the second reference temperature T2, the cell balancing pulse has a duty ratio of 0% and thus cell balancing is stopped.

Referring back to FIG. 5, the temperature measuring unit 420 may have a plurality of thermometers TH, each of which are for respectively measuring a temperature of each of the cell balancing resistors R. According to the current embodiment, a number of the thermometers TH may correspond to a number of the cell balancing resistors R so as to measure temperatures of all the cell balancing resistors R. Alternatively, a number of the thermometers TH may be less than that of the cell balancing resistors R so as to measure temperatures of only some, for example, two or more of the cell balancing resistors R.

The AFE 430 receives temperature detecting signals from the thermometers TH to generate temperature data TEMP, and transmits the temperature data TEMP to the cell balancing controller 440 and/or the MCU 450. The temperature data TEMP may be, for example, an average value of the temperatures detected by the plurality of thermometers TH. In some embodiments, the temperature data TEMP is a minimum of the temperatures detected by the plurality of thermometers TH. In some embodiments, the temperature data TEMP is a maximum of the temperatures detected by the plurality of thermometers TH. In some embodiments, the temperature data TEMP is another statistical value, such as median and mean or median plus or minus a number of standard deviations, based on the temperatures detected by the plurality of thermometers TH.

Figure 8:
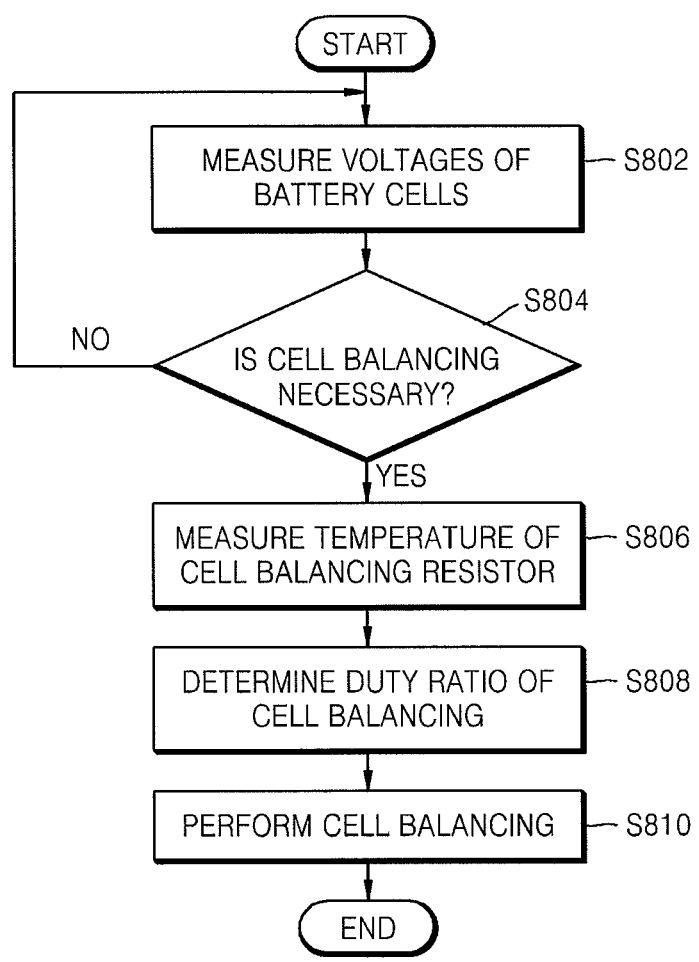
FIG. 8 is a flowchart illustrating a method of balancing a battery cell, according to an embodiment.

FIG. 8 is a flowchart illustrating a method of balancing the battery cell, according to an embodiment. According to the method of balancing the battery cell, voltages of the battery cells of the corresponding battery tray 110-$k$ are measured (S802).

After the voltages of the battery cells are measured, it is determined whether cell balancing is to be performed (S804) according to a difference in voltage between the battery cells. If the difference in voltage between the battery cells is greater than a reference voltage, it is determined that cell balancing is to be performed, and if the difference in voltage between the battery cells is less than the reference voltage, it is determined that cell balancing is not to be performed.

When it is determined that cell balancing is not to be performed, a cell balancing operation is not performed during the corresponding cycle. When it is determined that cell balancing is to be performed, a temperature of at least one cell balancing resistor R of the corresponding battery BMS 120-$k$ is measured (S806), as discussed above. In this regard, temperatures of all the cell balancing resistors R of the corresponding battery BMS 120-$k$ may be measured, or alternatively, temperatures of only some of the cell balancing resistors R of the corresponding battery BMS 120-$k$ may be measured.

If the temperatures of the cell balancing resistors R are measured, a time for the cell balancing resistors to be connected across the battery cells is determined according to the measured temperature (S808). For example, to determine the time for the cell balancing resistors to be connected across the battery cells, a duty ratio of cell balancing may be determined. According to the current embodiment, if the measured temperature is less than the first reference temperature T1, a duty ratio of a cell balancing pulse is not changed, and if the measure temperature is equal to or greater than the first reference temperature T1, a duty ratio of a cell balancing pulse is controlled according to the measured temperature. In this regard, as the measured temperature increases, as discussed above, a duty ratio of the cell balancing pulse is decreased. If the measured temperature is equal to or greater than the second reference temperature T2, a duty ratio of the second reference temperature T2 may be set to 0% so as not to perform cell balancing.

If a duty ratio of the cell balancing pulse is determined, cell balancing is performed according to the determined duty ratio (S810).

While various aspects and features have been particularly shown and described with reference to exemplary embodiments, it will be understood by those of ordinary skill in the art that various changes in form and details may be made therein without departing from the spirit and scope of the invention. For example, the one or more embodiments are described with reference to a case in which the battery system 20 is used in the energy storage system 1 but the present invention is not limited to the specifically disclosed embodiments and thus may include various embodiments in which the battery system 20 is used with other devices.

What is claimed is:

1. An energy storage system, configured to be connected to at least one of a power generating system, a grid, and a load, the energy storage system comprising:
   a battery system configured to store power received from at least one of the grid and the power generating system and/or to provide power to at least one of the grid and the load, the battery system comprising:
      a plurality of resistors for cell balancing, each resistor configured to be selectively connected across one battery cell of a plurality of battery cells, and
      a cell balancing controller configured to determine at time for the resistors to be connected across the battery cells according to a temperature of at least one of the resistors.

2. The system of claim 1, wherein the battery system further comprises a temperature measuring unit, configured to measure a temperature of the resistors for cell balancing.

3. The system of claim 2, wherein the temperature measuring unit is configured to measure a temperature for each of at least two of the resistors, and the measured temperature of the resistors is an average of the temperatures of the at least two resistors.

4. The system of claim 2, wherein the temperature measuring unit is configured to measure a temperature for each of at least two of the resistors, and the measured temperature of the resistors is a maximum of the temperatures of the at least two resistors.

5. The system of claim 2, wherein the temperature measuring unit is configured to measure a temperature for each the resistors, and the measured temperature of the resistors is a maximum or an average of the temperatures of the resistors.

6. The system of claim 1, wherein the cell balancing controller is configured to connect the resistors across the battery cells for a first time period if the temperature of at least one of the resistors is less than a first temperature threshold, and wherein the cell balancing controller is configured to connect the resistors across the battery cells for a second time period if the temperature of at least one of the resistors is greater than the first temperature threshold, wherein the first time period is greater than the second time period.

7. The system of claim 6, wherein the cell balancing controller is configured to disconnect the resistors from the battery cells if the temperature of the resistors is greater than a second temperature threshold.

8. The system of claim 1, wherein the cell balancing controller is configured to connect the resistors across the battery cells for a duty ratio which is determined by a function of a temperature of the resistors if the temperature of the resistors is greater than or equal to a first threshold and is less than or equal to a second threshold, wherein the duty ratio has a first value if the temperature of the resistors is equal to or less than the first threshold, and wherein the duty ratio has a second value if the temperature of the resistors is equal to or greater than the second threshold, wherein the second value is less than the first value.

9. The system of claim 8, wherein the function is linear.

10. The system of claim 1, further comprising a power conversion system configured to convert power from at least one of the power generating system and the grid for the battery system, and to convert power from the battery system for the grid or the load.

11. A method of balancing battery cell voltages, the method comprising:
   selectively connecting a plurality of resistors for cell balancing to a plurality of battery cells; and
   varying a time for the resistors to be connected across the battery cells according to a temperature of at least one of the resistors.

12. The method of claim 11, further comprising measuring a temperature of the resistors for cell balancing.

13. The method of claim 12, wherein the measuring a temperature of the resistors for cell balancing comprises measuring a temperature for each of at least two of the resistors, and the measured temperature of the resistors for cell balancing is an average of the temperatures of the at least two resistors.

14. The method of claim 12, wherein the measuring a temperature of the resistors for cell balancing comprises measuring a temperature for each of at least two of the resistors, and the measured temperature of resistors for cell balancing is a maximum of the temperatures of the at least two resistors.

15. The method of claim 12, wherein measuring a temperature of the resistors for cell balancing comprises measuring a temperature for each the resistors, and the measured temperature of the resistors for cell balancing is a maximum or an average of the temperatures of the resistors.

16. The method of claim 11, wherein the time for the resistors to be connected across the battery cells is determined to have a first value if the temperature of at least one of the resistors is less than a first temperature threshold, and the time for the resistors to be connected across the battery cells is determined to have a second value if the temperature of at least one of the resistors is greater than a second temperature threshold, and wherein the second value is less than the first value.

17. The method of claim 16, wherein the resistors are disconnected from the battery cells if the temperature of at least one of the resistors is greater than the second temperature threshold.

18. The method of claim 11, wherein the time for the resistors to be connected across the battery cells is determined by a duty ratio, and the duty ratio is determined to have a value which is determined by a function of the temperature of at least one of the resistors if the temperature of at least one of the resistors is greater than or equal to a first threshold and is less than or equal to a second threshold.

19. The method of claim 18, wherein the function is linear.

20. The method of claim 11, further comprising:
   converting power from at least one of a power generating system and a grid for a battery system; and
   converting power from the battery system for the grid or a load.

* * * * *